US010320243B2

(12) United States Patent
Tokura et al.

(10) Patent No.: US 10,320,243 B2
(45) Date of Patent: Jun. 11, 2019

(54) WIRELESS POWER SUPPLY SYSTEM

(71) Applicant: IHI CORPORATION, Tokyo (JP)

(72) Inventors: Susumu Tokura, Tokyo (JP);
Masakazu Hara, Tokyo (JP); Kentaro Furiya, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/208,947

(22) Filed: Jul. 13, 2016

(65) Prior Publication Data

US 2016/0318408 A1   Nov. 3, 2016

Related U.S. Application Data

(63) Continuation of application No. PCT/JP2015/050019, filed on Jan. 5, 2015.

(30) Foreign Application Priority Data

Jan. 21, 2014  (JP) ................. 2014-008659

(51) Int. Cl.
*H01F 27/42*     (2006.01)
*H01F 37/00*     (2006.01)
*H01F 38/00*     (2006.01)
*H02J 50/70*     (2016.01)
*H02J 7/02*      (2016.01)
(Continued)

(52) U.S. Cl.
CPC ............. *H02J 50/70* (2016.02); *B60L 11/182* (2013.01); *B60L 11/1824* (2013.01); *H01F 38/14* (2013.01); *H02J 7/022* (2013.01); *B60L 2270/147* (2013.01); *B60M 7/003* (2013.01);

*H02J 7/0027* (2013.01); *H02J 17/00* (2013.01); *H02J 50/90* (2016.02); *Y02T 10/7005* (2013.01); *Y02T 10/7055* (2013.01);
(Continued)

(58) Field of Classification Search
CPC ..... B60L 11/182; B60L 11/1824; H02J 7/025; H02J 50/12; H02J 50/90; H02J 7/0027; H02J 50/70; Y02T 90/122
See application file for complete search history.

(56) References Cited

U.S. PATENT DOCUMENTS 5,821,731 A * 10/1998 Kuki .................. B60L 11/1805
                                                      320/108
2010/0327803 A1  12/2010 Katsura
(Continued)

FOREIGN PATENT DOCUMENTS

CN    102782985 A    11/2012
CN    105593072 A    5/2016
(Continued)

*Primary Examiner* — Rexford N Barnie
*Assistant Examiner* — Rasem Mourad
(74) *Attorney, Agent, or Firm* — Volpe and Koenig, P.C.

(57) ABSTRACT

Provided is a wireless power-supplying system equipped with a power-supplying coil disposed on the ground side, and a power-receiving coil that is mounted on a movable body and wirelessly receives power supplied from the power-supplying coil. In addition, the wireless power-supplying system is provided with a recovery coil in the vicinity of a space between the power-supplying coil and the power-receiving coil such that a wound face thereof intersects leakage flux occurring when the power is supplied from the power-supplying coil to the power-receiving coil.

4 Claims, 3 Drawing Sheets

(51) Int. Cl.
    *H01F 38/14*    (2006.01)
    *B60L 11/18*    (2006.01)
    *H02J 17/00*    (2006.01)
    *B60M 7/00*    (2006.01)
    *H02J 7/00*    (2006.01)
    *H02J 50/90*    (2016.01)

(52) U.S. Cl.
    CPC .......... *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 2011/0175455 A1* | 7/2011 | Hashiguchi | H02J 5/005 307/104 |
| 2011/0187320 A1* | 8/2011 | Murayama | H02J 7/00 320/108 |
| 2011/0254378 A1 | 10/2011 | Ichikawa et al. | |
| 2011/0316334 A1* | 12/2011 | Shimokawa | B60R 1/07 307/10.1 |
| 2012/0013198 A1* | 1/2012 | Uramoto | H02J 5/005 307/104 |
| 2013/0119925 A1 | 5/2013 | Kawamura | |
| 2014/0021798 A1* | 1/2014 | Kesler | H02J 17/00 307/104 |
| 2014/0339911 A1* | 11/2014 | Abe | H02J 5/005 307/104 |
| 2014/0339913 A1* | 11/2014 | Tsuji | H02J 5/005 307/104 |
| 2016/0288657 A1 | 10/2016 | Tokura | |

FOREIGN PATENT DOCUMENTS

| | | | | |
|---|---|---|---|---|
| JP | 09-298847 | A | 11/1997 | |
| JP | 2010-263690 | A | 11/2010 | |
| JP | 2010263690 | A * | 11/2010 | ............. H02J 5/005 |
| JP | 2011-010444 | A | 1/2011 | |
| JP | 2011-130614 | A | 6/2011 | |
| JP | 2011130614 | A * | 6/2011 | |
| JP | 2011-160505 | A | 8/2011 | |
| JP | 4743244 | B2 | 8/2011 | |

\* cited by examiner

WIRELESS POWER SUPPLY SYSTEM

This application is a continuation application based on a PCT Patent Application No. PCT/JP2015/050019, filed on Jan. 5, 2015, whose priority is claimed on Japanese Patent Application No. 2014-8659, filed on Jan. 21, 2014. The contents of both the PCT application and the Japanese Patent Application are incorporated herein by reference.

TECHNICAL FIELD

The present disclosure relates to a wireless power-supplying system.

BACKGROUND ART

In recent years, wireless power-supplying systems in which a power-transmitting resonator having a coil of a power-supplying side (power-supplying coil) is installed on the ground or is buried to be flush with the ground, an electric vehicle provided with a power-receiving resonator having a coil of a power-receiving side (power-receiving coil) is stopped above the power-transmitting resonator, and power is wirelessly supplied to the power-receiving coil from the power-supplying coil have come to be known (e.g., see Patent Document 1).

DOCUMENT OF RELATED ART

Patent Document

[Patent Document 1]
Japanese Patent No. 4743244

SUMMARY OF DISCLOSURE

Technical Problem

However, in the conventional wireless power-supplying system, there is an electromagnetic field that is wasted without being used to supply power because the electromagnetic field is emitted to the surroundings during wireless supply of the power. For this reason, there is a problem that the supplied energy is uselessly consumed to such an extent.

The present disclosure is conceived in view of the above-described circumstances, and thus an object of the present disclosure is to provide a wireless power-supplying system that recovers an electromagnetic field (leakage flux) that is wasted without being used to supply power during wireless supply of the power as the power and makes it possible to effectively use the power.

Solution to Problem

A wireless power-supplying system of the present disclosure includes: a power-supplying coil disposed on a ground side; and a power-receiving coil mounted on a movable body and configured to wirelessly receive power supplied from the power-supplying coil. At least one recovery coil is provided in the vicinity of a space between the power-supplying coil and the power-receiving coil such that wound faces thereof intersect leakage flux occurring when the power is supplied from the power-supplying coil to the power-receiving coil.

Also, in the wireless power-supplying system, a plurality of the recovery coils may be provided in the height direction of the space.

Also, in the wireless power-supplying system, a moving mechanism configured to move the recovery coil may be provided for the recovery coil to displace the recovery coil from a state in which the recovery coil lies above or on the ground or is retracted in the ground to a state in which the recovery coils stand up in the vicinity of the space.

In addition, in the wireless power-supplying system, the moving mechanism may include a support configured to be extendable or contractible, and the support may have the plurality of recovery coils, be configured to increase or reduce an interval between the recovery coils by the extension or contraction of the support, and be configured to stop the extension of the support by touching a bottom portion of the movable body by a leading end of the support.

Effects

According to the wireless power-supplying system of the present disclosure, since the recovery coil is provided in the vicinity of the space between the power-supplying coil and the power-receiving coil such that the wound face thereof intersects the leakage flux occurring when the power is supplied from the power-supplying coil to the power-receiving coil, it is possible for the recovery coil to recover the leakage flux (electromagnetic field) that is wasted without being used to supply the power, to convert the leakage flux into the power, and to thereby effectively use the power. Therefore, it is possible to efficiently use energy supplied from the power-supplying coil side and to increase energy efficiency.

DESCRIPTION OF EMBODIMENTS

Hereinafter, a wireless power-supplying system of the present disclosure will be described in detail with reference to the drawings.

The scale of each member is appropriately modified in the attached drawings so that each member has a recognizable size.

First Embodiment

Figure 1:
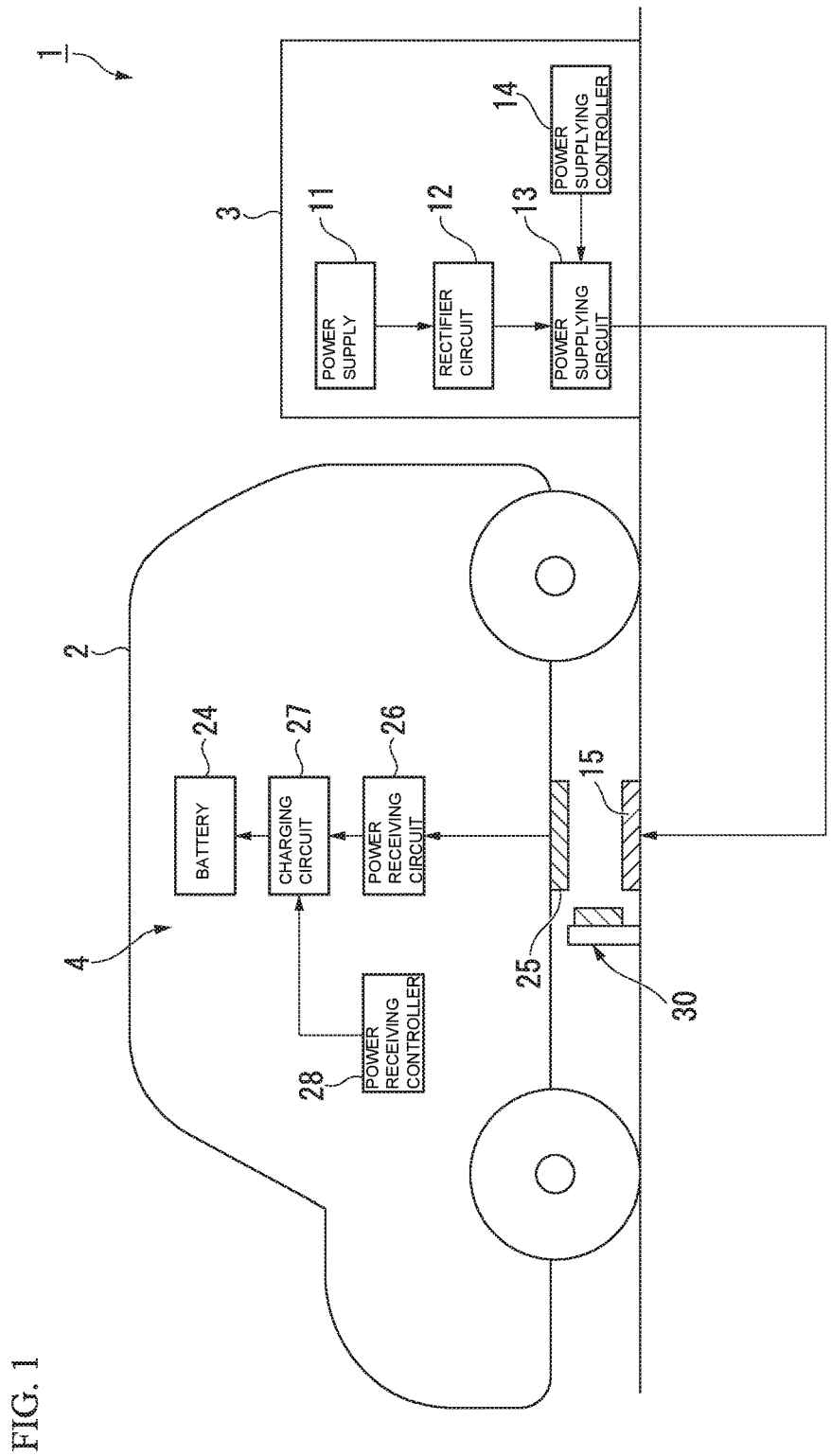
FIG. 1 is a block diagram showing constitutions of main parts of a wireless power-supplying device according to a first embodiment of the present disclosure.

FIG. 1 is a block diagram showing constitutions of main parts of a wireless power-supplying system 1 according to a first embodiment of the present disclosure. A reference sign 1 of FIG. 1 indicates a wireless power-supplying system. This wireless power-supplying system 1 is a system (apparatus) for charging batteries mounted in vehicles (movable bodies) such as electric vehicles or hybrid vehicles.

The wireless power-supplying system 1 is provided with a power-supplying device 3 that is installed on a ground side, a power-receiving device 4 that is installed at a vehicle (movable body) 2 side, and a leakage flux recovery unit 30 for recovering leakage flux. The power-supplying device 3 is installed on the ground, and is configured to be able to wirelessly transmit power (power for charging a battery 24)

to the power-receiving device 4 of the vehicle 2 when the vehicle 2 traveling on the ground is stopped in a predetermined positional relation (positional relation in which an electromagnetic coupling circuit to be described below is formed).

This power-supplying device 3 is provided with a power supply 11, a rectifier circuit 12, a power-supplying circuit 13, a power-supplying controller 14, a power-supplying coil (power-supplying resonator) 15, and so on. The power-supplying device 3 produces power suitable for wireless supply to the power-receiving device 4, and performs various controls required to wirelessly supply the power to the power-receiving device 4.

The power supply 11 supplies power, for instance three-phase alternating current (AC) power in which a voltage is 200 [V], required to produce the power to be transmitted to the vehicle 2. This power supply 11 is not limited to a three-phase AC power supply, and may be a power supply that supplies single-phase AC power such as a commercial AC power supply.

The rectifier circuit 12 is a circuit that converts the AC power supplied from the power supply 11 into direct current (DC) power. As the power supply 11, a DC power supply such as a fuel cell or a solar cell may also be used. In this case, the rectifier circuit 12 can be omitted.

The power-supplying circuit 13 wirelessly supplies the power supplied from the rectifier circuit 12 to the vehicle 2 via an electromagnetic coupling circuit that is formed of the power-supplying coil 15 and a power-receiving coil 25 provided for the vehicle 2. To be specific, the power-supplying circuit 13 is provided with a resonance capacitor that constitutes a power-supplying side resonant circuit along with the power-supplying coil 15, converts the DC power from the rectifier circuit 12 into AC power (high-frequency power) having a higher frequency than the AC power of the power supply 11 under control of the power-supplying controller 14, and outputs the converted AC power to the power-supplying coil 15.

The power-supplying controller 14 controls the power-supplying circuit 13 to produce the power to be supplied to the power-receiving device 4. This power-supplying controller 14 is provided with a central processing unit (CPU), a memory, and so on, and conducts the above-described various controls on the basis of a previously prepared control program.

The power-supplying coil 15 is a coil for wirelessly supplying the AC power supplied from the power-supplying circuit 13 as described above to the vehicle 2, and is formed of, for instance, a helical coil having dimensions of a predetermined coil shape. The power-supplying coil 15 may be integrally provided with a cover formed of a non-magnetic material such as a plastic out of which the power-supplying coil 15 is molded. This power-supplying coil 15 wirelessly supplies the power to the power-receiving device 4 by generating a magnetic field corresponding to the high-frequency power supplied from the power-supplying circuit 13. The power-supplying coil 15 may be formed of a coil of a so-called solenoid type in which the direction of a winding axis is a horizontal direction.

The vehicle 2 is a car that is driven by a driver to travel on a road, for instance, an electric vehicle or a hybrid vehicle provided with a traveling motor acting as a power generating source, and is provided with the power-receiving device 4 as shown in FIG. 1. Although omitted in FIG. 1, the vehicle 2 is provided with constitutions required for traveling, such as an engine, a traveling motor, an operating wheel, and a brake.

The power-receiving device 4 is provided with a power-receiving coil 25, a power-receiving circuit 26, a charging circuit 27, a battery 24, and a power-receiving controller 28. The power-receiving coil 25 is formed of a spiral or helical coil having almost the same coil diameter as the above-described power-supplying coil 15. The power-receiving coil 25 may be integrally provided with a cover formed of a non-magnetic material such as a plastic out of which the power-receiving coil 25 is molded. This power-receiving coil 25 is provided at the bottom of the vehicle 2 in a posture in which its axis extends upward and downward (in a vertical direction) to be able to face the power-supplying coil 15. This power-receiving coil 25 has opposite ends connected to input terminals of the power-receiving circuit 26, generates an electromotive force when a magnetic field of the power-supplying coil 15 acts thereon, and outputs the generated electromotive force to the power-receiving circuit 26. The power-receiving coil 25 may be formed of a so-called solenoid type in which the direction of a winding axis is a horizontal direction.

The power-receiving circuit 26 receives power (AC power) that is wirelessly supplied via the electromagnetic coupling circuit formed by the power-supplying coil 15 and the power-receiving coil 25, converts the received power into DC power, and outputs the converted DC power to the charging circuit 27. This power-receiving circuit 26 is provided with a resonance capacitor that constitutes a power-receiving resonant circuit along with the power-receiving coil 25. Capacitance of the resonance capacitor of the power-receiving circuit 26 is set such that a resonant frequency of the power-receiving resonant circuit is identical to that of the above-described power-supplying resonant circuit.

The charging circuit 27 has an input terminal connected to an output terminal of the power-receiving circuit 26 and an output terminal connected to an input terminal of the battery 24, and charges the battery 24 with the power (DC power) from the power-receiving circuit 26. The battery 24 is a rechargeable battery (e.g., a secondary battery such as a lithium-ion battery or a nickel-hydrogen battery) mounted in the vehicle 2, and supplies power to the traveling motor (not shown), and so on. The power-receiving controller 28 is provided with a CPU, a memory, and so on, and controls the charging circuit 27 on the basis of a previously prepared power-receiving control program.

Figure 2:
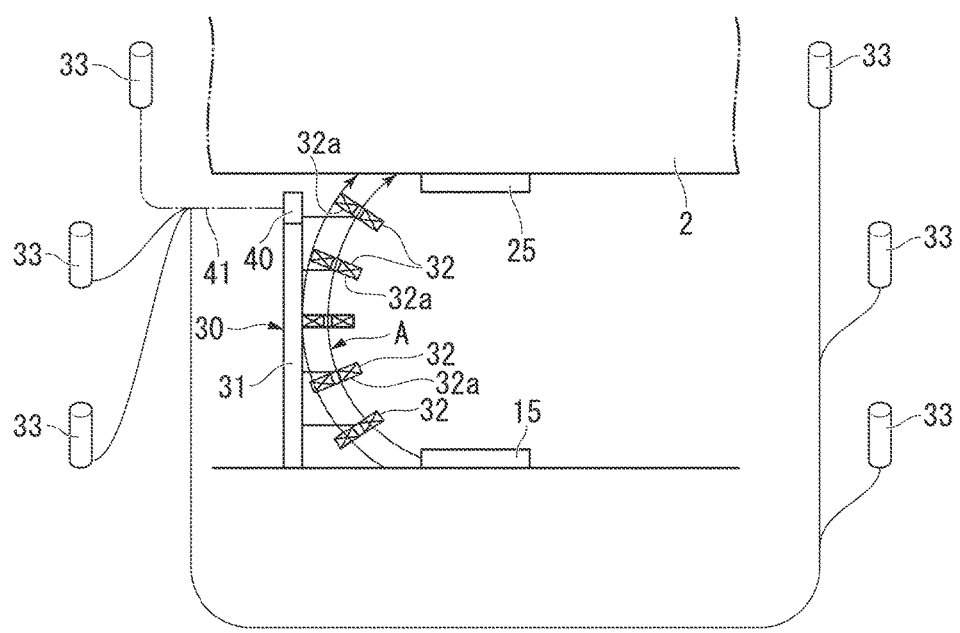
FIG. 2 is a schematic diagram showing the first embodiment of the present disclosure.

Also, in the present embodiment, the leakage flux recovery unit 30 is disposed between the ground and the vehicle 2 in the vicinity of a space between the power-supplying coil 15 and the power-receiving coil 25. In the present embodiment, as shown in FIG. 2, the leakage flux recovery unit 30 is made up of a post-like support 31 and recovery coils 32 provided for the support 31. The plurality of recovery coils 32 are mounted almost at regular intervals in a length direction (height direction) of the support 31. That is, the recovery coils 32 are mounted to run in a height direction of the space between the power-supplying coil 15 and the power-receiving coil 25. Each of the recovery coils 32 is a coil of a helical type in which a conducting wire such as a round wire or a rectangular wire is wound in the same plane in a helical shape.

Also, these recovery coils 32 are mounted on the support 31 via adequate mounting jigs such that wound faces 32a thereof (faces perpendicular to axes thereof) intersect leakage flux A, which occurs when power is transmitted from the power-supplying coil 15 to the power-receiving coil 25, in a state in which the wound faces 32a meet at angles as close to right angles as possible. That is, these recovery coils 32 are adjusted such that their wound faces 32a have adequate angles according to a mounting position (mounting height), etc. of the support 31 to nearly intersect the leakage flux A. With this constitution, the recovery coils 32 can efficiently receive the leakage flux A, and produce an induced voltage to obtain power.

Here, the support 31 is provided with a power-transferring device 40 having a constitution similar to that of the power-receiving device 4. That is, this power-transferring device 40 is provided with circuits (not shown) similar to the power-receiving circuit 26 and the charging circuit 27 in the power-receiving device 4, and is also provided with components similar to the battery 24 and the power-receiving controller 28 as needed. Also, a cable 41 is connected to the power-transferring device 40, or a relay power-supplying coil (not shown) for wirelessly supplying power is provided for the power-transferring device 40.

Thereby, the power obtained by the recovery coils 32 is supplied to loads provided outside via the power-transferring device 40. As the loads, for instance, lights 33 disposed adjacent to the power-supplying device 3 as shown in FIG. 2 may be used.

In general, the wireless supply of power is different from cable supply of power, and has a drawback that it is not known by any person around the vehicle 2 whether or not the power is being supplied to the vehicle 2. That is, in the case of the cable supply of power, since a cable is connected to the vehicle 2, it can be easily confirmed by any person around the vehicle 2 that the power is being supplied. However, in the case of the wireless supply of power, since there is no substitute for the cable, it is not known whether or not the power is being supplied.

Thus, as described above, by providing the lights 33, recovering the leakage flux A inevitably occurring during the wireless supply of power using the recovery coils 32, and turning on the lights 33 with the obtained power, it can be easily known by any person around the vehicle 2 that the vehicle 2 is being wirelessly supplied with the power.

In addition to the lights 33 shown in FIG. 2, various means may be applied as the loads.

For example, by providing the power-transferring device 40 with power transmission terminals, providing the vehicle 2 with power reception terminals, and connecting these terminals, a current may be conducted to a heater provided for a front windshield or a rear windshield of the vehicle 2. That is, various electric appliances provided in the vehicle 2 may be used as loads.

Also, a heater may be buried in the neighborhood of the ground on which the power-supplying coil 15 is installed, and the power-transferring device 40 may be connected to the heater. Thus, the heater is caused to generate heat by the power that is recovered and obtained by the recovery coils 32, and thereby snow that has accumulated on the ground in which the heater is buried can be melted. That is, the leakage flux recovery unit 30 may be used as a power supply of a snow melting device made up of a heater.

According to the wireless power-supplying system 1 of the present embodiment, since the recovery coils 32 are provided in the vicinity of the space between the power-supplying coil 15 and the power-receiving coil 25 such that their wound faces 32a approximately intersect the leakage flux A occurring when the power is supplied from the power-supplying coil 15 to the power-receiving coil 25, the leakage flux A (electromagnetic field) that is wasted without being used to supply the power can be recovered and converted into the power by the recovery coils 32, and thereby be effectively used. That is, the obtained power is supplied to the loads such as the lights 33, and thereby it can be effectively used. For example, it can be easily known from the surroundings that the power is being wirelessly supplied.

Therefore, it is possible to efficiently use energy supplied from the power-supplying device 3 and to increase energy efficiency.

Also, by efficiently using the energy supplied from the power-supplying device 3 in this way, it is possible to reduce an influence of a radiation electromagnetic field on the surroundings.

Also, since the plurality of recovery coils 32 are mounted in the length direction (height direction) of the support 31 to run in the height direction of the space between the power-supplying coil 15 and the power-receiving coil 25, it is possible for these recovery coils 32 to receive more of the leakage flux A and to obtain more power.

Second Embodiment

Figure 3A:
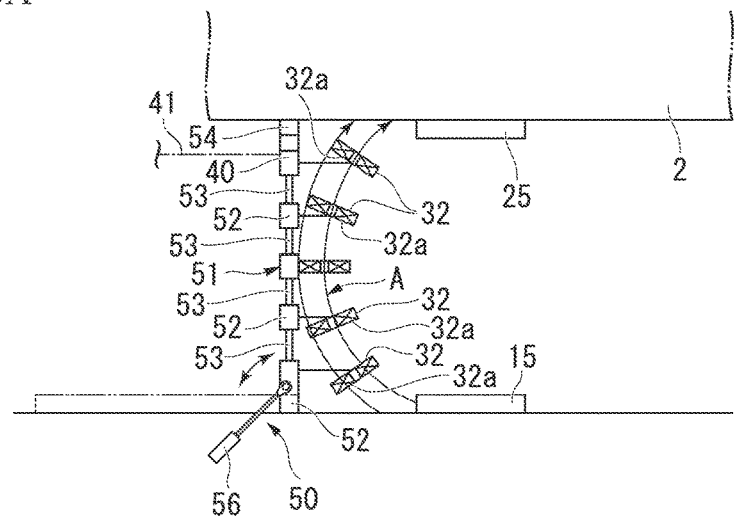
FIG. 3A is a schematic diagram showing a second embodiment of the present disclosure.
Figure 3B:
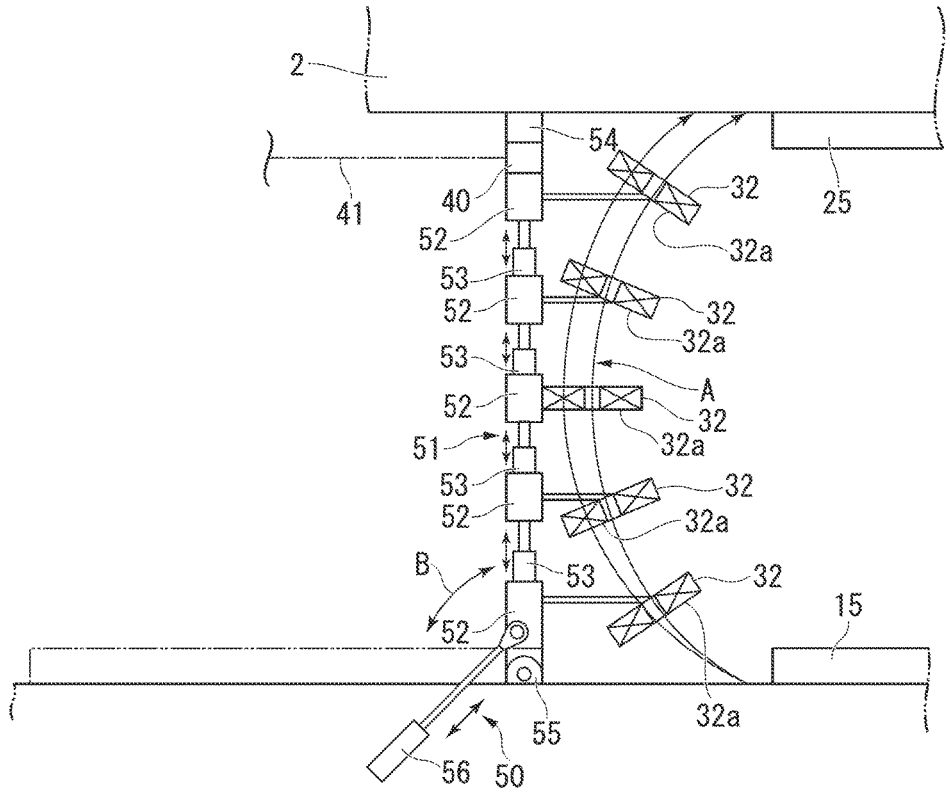
FIG. 3B is an enlarged diagram of main parts of FIG. 3A.

FIGS. 3A and 3B are schematic diagrams showing a second embodiment of the present disclosure.

A wireless power-supplying system shown in FIGS. 3A and 3B is different from the wireless power-supplying system 1 of the first embodiment shown in FIGS. 1 and 2 in that recovery coils 32 are provided with a moving mechanism 50 for changing states thereof.

That is, in the present embodiment, a support 51 supporting the plurality of recovery coils 32 is telescopically configured. A part of the moving mechanism 50 is configured by the support 51 that is telescopically configured in this way. This support 51 is configured such that a plurality of posts 52 that correspond to the plurality of recovery coils 32 (and are equal in number to the recovery coils 32) and air actuators 53 provided between these posts 52 and 52 are disposed and formed in a straight line shape, a power-transferring device 40 is provided at a leading end (upper end) thereof, and a cushion part 54 formed of rubber is further provided ahead of (on) the power-transferring device 40.

Each of the air actuators 53 is formed of, for instance, an air cylinder, causes a piston rod to be raised or lowered (to advance or retreat) by a pneumatic pressure, and thereby increases or reduces an interval between the posts 52 and 52. Thereby, a length of the support 51 is extendable or contractible. Here, the length (height) of the support 51 is formed to be shorter (lower) than a legal minimum vehicle height for the vehicle, i.e., a distance (height) from a lower end of a tire to the bottom of a vehicle body, in a maximum contracted state in which the piston rods of all of the air actuators 53 are lowered.

Also, the lowermost post 52 is rotatably supported on a fixture 55 provided on the ground. Accordingly, a lower end of the support 51 is fixed to the ground to be rotatable in a direction (forward and backward) indicated by an arrow B of FIG. 3B. Thus, aside from the air actuator 53, a rotary air actuator 56 is coupled to the support 51. In the rotary air actuator 56, for example, a cylinder part is buried in the ground, and a tip of a piston rod is rotatably coupled to the lowermost post 52 of the support 51.

With this constitution, the rotary air actuator 56 is actuated to allow the support 51 to be displaced from a state in which it has fallen down to the ground side as indicated by a two-dot chain line of FIG. 3B to a state in which it stands up in the vicinity of the space between the power-supplying coil 15 and the power-receiving coil 25 as indicated by a solid line of FIG. 3B. Thus, the support 51 is controlled to fall down to the ground side in a state in which the vehicle 2 is not parked above the power-supplying coil 15.

This rotary air actuator 56 also constitutes the moving mechanism 50 in the present embodiment along with the support 51 that is telescopically configured. That is, as described above, the recovery coils 32 are mounted on the respective posts 52 of the support 51, and thus the support 51 is displaced from the state in which it has fallen down to the ground side to the state in which it stands up by the rotary air actuator 56. Thereby, the rotary air actuator 56 is also moved to be displaced from the state in which it has fallen down to the ground side to the state in which it stands up. Further, a compressor (not shown) is connected to the rotary air actuator 56 and the air actuators 53, and supplies and exhausts compressed air.

Here, the moving mechanism 50 is provided with a controller (not shown) that controls its operation, and this controller is provided for, for instance, the power-supplying device 3. Thus, for example, when a signal to the effect that the supplied power is received from the power-supplying device 3 is generated by the vehicle 2, the controller receives this signal to send an operation command to the moving mechanism 50, and causes the leakage flux recovery unit 30 to function.

That is, the moving mechanism 50 actuates the rotary air actuator 56 first, and displaces the support 51 from the state in which the support 51 has fallen down to the ground side to the state in which the support 51 stands up. When the support 51 stands up in this way, the moving mechanism 50 actuates each of the air actuators 53 to raise the piston rod from the cylinder, and thereby increases the interval between the posts 52 and 52. Then, each of the air actuators 53 is extended. Thereby, the support 31 is extended in a vertical direction, and the cushion part 54 of the leading end (upper end) thereof comes into contact with the bottom (bottom portion) of the vehicle 2. Thereby, the support 51 stops its extension, is held with the cushion part 54 pressed against the bottom (bottom portion) of the vehicle 2, and is located beside the space between the power-supplying coil 15 and the power-receiving coil 25.

Thereby, similar to the first embodiment shown in FIG. 2, the recovery coils 32 mounted on the support 31 are located adjacent to the space between the power-supplying coil 15 and the power-receiving coil 25, and cause their wound faces 32a to be nearly orthogonal to (intersect) the leakage flux A.

Thus, when the signal instructing the power-supplying device 3 to supply the power is sent from the vehicle 2, the power is wirelessly supplied from the power-supplying coil 15 toward the power-receiving coil 25. In addition to this, each of the recovery coils 32 also receives the leakage flux A, which inevitably occurs during the wireless supply of power, to obtain the power.

Thus, when the supply of power is completed, and a signal to that effect is sent from the vehicle 2 to the power-supplying device 3, the support 51 returns to an initial state according to the operation of the moving mechanism 50 thereof. That is, each of the air actuators 53 lowers its piston rod, and thereby reduces the interval between the posts 52 and 52. Also, after all the air actuators 53 are contracted, the rotary air actuator 56 retracts its piston rod, and thereby causes the support 51 to fall down onto the ground.

By causing the support 51 to fall down in this way, it is possible to inhibit the leakage flux recovery unit 30 from being deteriorated by an influence of wind or the like. That is, if the support 51 stood up even when the supply of power is not performed on the vehicle 2, foreign materials could easily adhere under the influence of wind or the like, and big foreign materials could also bump against the support 51, which could cause malfunctions. However, by causing the support 51 to fall down onto the ground, it is possible to relieve this influence of wind or the like.

Even in the present embodiment, a cable 41 is connected to the power-transferring device 40 of the leakage flux recovery unit 30, or a relay power-supplying coil (not shown) for wirelessly supplying power is provided for the power-transferring device 40. Thereby, the power obtained by the recovery coils 32 is supplied to loads provided outside via the power-transferring device 40, as in the first embodiment. Although not shown, the loads are applied to, for instance, the lights 33 as shown in FIG. 2, the various electric appliances described above such as a heater provided in the vehicle 2, the heater (snow melting device) buried in the neighborhood of the ground on which the power-supplying coil 15 is installed, and so on.

Even in the wireless power-supplying system 1 of the present embodiment, since the recovery coils 32 are provided in the vicinity of the space between the power-supplying coil 15 and the power-receiving coil 25 such that their wound faces 32a are approximately orthogonal to (intersect) the leakage flux A occurring when the power is supplied from the power-supplying coil 15 to the power-receiving coil 25, the leakage flux A (electromagnetic field) wasted without being used to supply the power can be recovered and converted into the power by the recovery coils 32, and thereby be effectively used. That is, the obtained power is supplied to the loads such as the lights 33, and thereby it can be effectively used. For example, it can be easily known from the surroundings that the power is being wirelessly supplied.

Therefore, it is possible to efficiently use energy supplied from the power-supplying device 3 and to increase energy efficiency.

Also, by efficiently using the energy supplied from the power-supplying device 3 in this way, it is possible to reduce an influence of a radiation electromagnetic field on the surroundings.

Also, since the moving mechanism 50 is provided for the recovery coils 32 via the support 51, and particularly the recovery coils 32 are made movable by the rotary air actuator 56 to be displaced from the state in which they lies above or on the ground to the state in which they stand up, the recovery coils 32 are caused to fall down along with the support 51 when no power is supplied to the vehicle as described above. Thereby, it is possible to inhibit the leakage flux recovery unit 30 from being deteriorated by the influence of wind or the like.

Also, since the support 51 is telescopically configured by the air actuators 53, since an interval between the recovery coils 32 and 32 is configured to extend or contract in association with the extension or contraction of the support 51, and since the support 51 is further configured to stop extending when the leading end thereof comes into contact with the bottom portion of the vehicle 2, it is possible to sufficiently extend the support 51 according to the vehicle height of the vehicle 2, and thus to greatly distribute (spread) the recovery coils 32 in a height direction. Accordingly, it is possible to receive and convert more of the leakage flux A into the power and to effectively use the converted power.

The present disclosure is not limited to the above-described embodiments, and various modifications are possible without departing from the spirit and scope of the present disclosure.

For example, the above-described embodiments are configured such that all the recovery coils 32 are disposed adjacent to the space, i.e., outside the space, between the power-supplying coil 15 and the power-receiving coil 25, and efficiency of normal reception or supply of power which is performed between the power-supplying coil 15 and the power-receiving coil 25 is not reduced. However, if this efficiency of normal reception or supply of power can be maintained to preset high efficiency, some of the recovery coils 32 may be located within the space between the power-supplying coil 15 and the power-receiving coil 25. In this way, as some of the recovery coils 32 are located within the space between the power-supplying coil 15 and the power-receiving coil 25, it is possible to produce more power at the leakage flux recovery unit 30. Therefore, it is possible to supply more power to the loads such as the lights 33.

Also, in the above-described embodiments, the plurality of (five in the shown example) recovery coils are provided. However, the number of recovery coils, coil diameters thereof, etc. may be arbitrarily set according to, for instance, a design of the wireless power-supplying system.

Further, in the above-described embodiments, the rotary air actuator 56 that displaces the support 51 from the state in which it has fallen down to the ground side to the state in which it stands up is used as the moving mechanism 50. However, instead of this, a device such as an air actuator that displaces the support 51 from a state in which it is retracted in the ground to a state in which it stands up may be used. For example, a pit is dug in the ground, and an air actuator is disposed at a bottom portion of this pit. Then, the support 51 is coupled to an upper end of a piston rod of this air actuator. Thereby, it is possible to cause the support 51 to be raised or lowered by an operation of this air actuator and to displace the support 51 from the state in which it is retracted in the ground to the state in which it stands up.

Also, the air actuators 53 increasing or reducing the interval between the posts 52 and 52 are used as means for extending or contracting the support 51. However, for example, compression springs (push springs) may be used instead of the air actuators 53.

INDUSTRIAL APPLICABILITY

According to the present disclosure, it is possible to provide the wireless power-supplying system that recovers the electromagnetic field (leakage flux) that is wasted without being used to supply power during the wireless supply of the power as the power and makes it possible to effectively use the power.

What is claimed is:

1. A wireless power-supplying system comprising:
a power-supplying coil disposed on a ground side;
a power-receiving coil mounted on a movable body and configured to wirelessly receive power supplied from the power-supplying coil;
a plurality of recovery coils provided in the vicinity of a space between the power-supplying coil and the power-receiving coil such that at least one wound face thereof intersects leakage flux occurring when power is supplied from the power-supplying coil to the power-receiving coil; and
a moving mechanism for moving the plurality of the recovery coils,
wherein
the plurality of the recovery coils are provided in a height direction of the space,
an angle of a wound face varies according to a mounting height, and
at least one of the plurality of the recovery coils is connected to at least one load,
wherein:
the moving mechanism includes a support supporting the plurality of recovery coils and configured to be extendable and contractible;
the support is configured such that a plurality of posts that correspond to the plurality of recovery coils and air actuators provided between these posts are disposed and formed in a straight line shape; and
the support is configured to increase and reduce an interval between the recovery coils by the extension and contraction of these posts by actuating each of the air actuators.

2. The wireless power-supplying system according to claim 1 wherein a moving mechanism displaces the plurality of the recovery coils from a state in which the recovery coils lie above or on the ground or are retracted in the ground to a state in which the recovery coils stand up in the vicinity of the space.

3. The wireless power-supplying system according to claim 2, wherein:
the support is configured to stop the actuators of the support by touching a bottom portion of the movable body by a leading end of the support.

4. A leakage flux recovery unit comprising:
a power-supplying coil disposed on a ground side;
a power-receiving coil mounted on a movable body and configured to wirelessly receive power supplied from the power-supplying coil;
a plurality of recovery coils provided in the vicinity of a space between the power-supplying coil and the power-receiving coil such that a wound face thereof intersects leakage flux occurring when the power is supplied from the power-supplying coil to the power-receiving coil; and
a moving mechanism for moving the plurality of the recovery coils,
wherein
the plurality of the recovery coils are provided in a height direction of the space,
an angle of the wound face varies according to a mounting height, and
the at least one of the plurality of the recovery coils is connected to at least one load,
wherein:
the moving mechanism includes a support supporting the plurality of recovery coils and configured to be extendable and contractible;
the support is configured such that a plurality of posts that correspond to the plurality of recovery coils and air actuators provided between these posts are disposed and formed in a straight line shape; and
the support is configured to increase and reduce an interval between the recovery coils by the extension and contraction of these posts by actuating each of the air actuators.

* * * * *